Oct. 9, 1956  J. C. ALLEN  2,765,850
PRODUCTION OF FORMATION-CLOGGING LIQUID HYDROCARBONS
Filed May 22, 1953
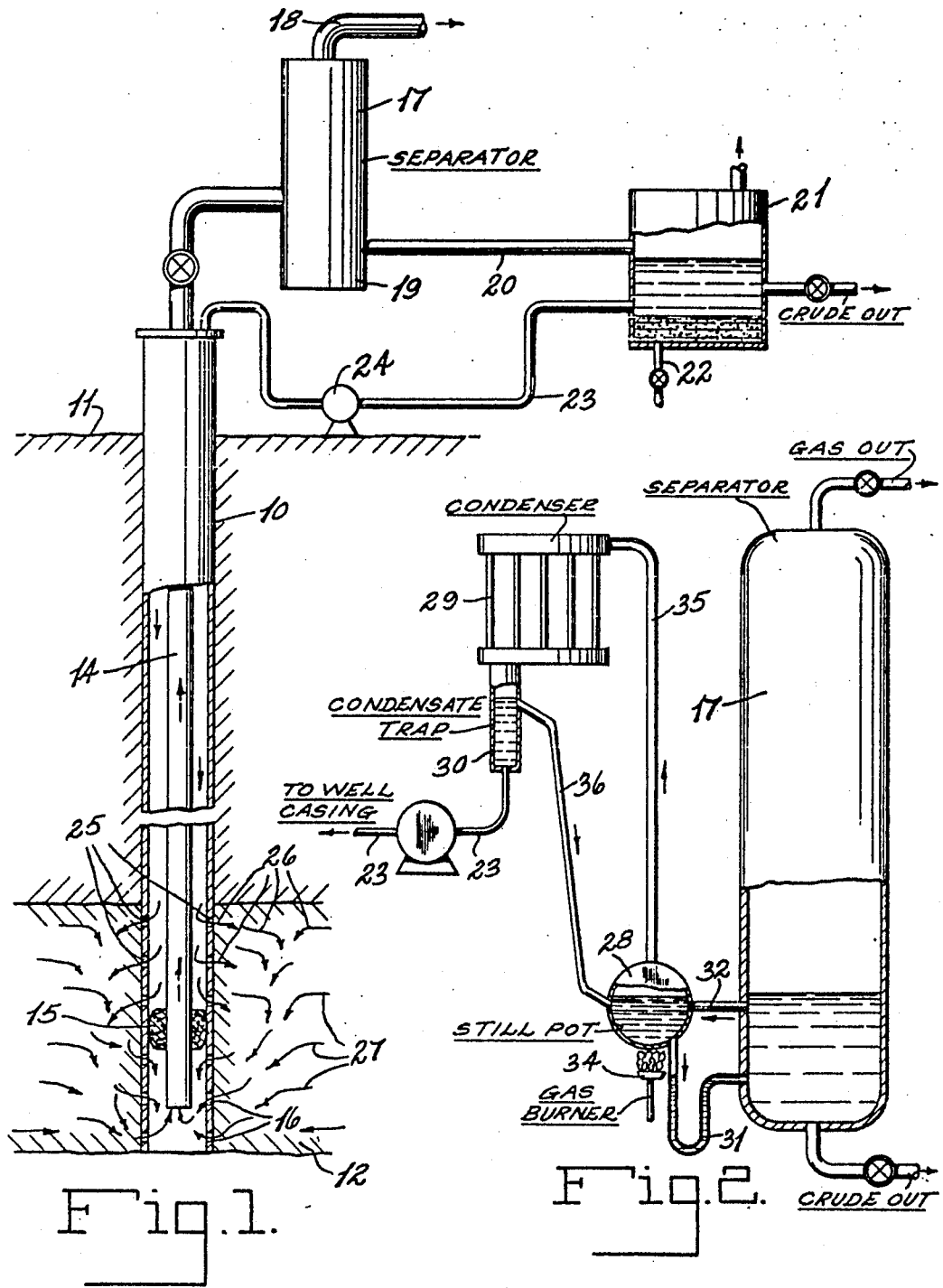

United States Patent Office 2,765,850
Patented Oct. 9, 1956

2,765,850

PRODUCTION OF FORMATION-CLOGGING LIQUID HYDROCARBONS

Joseph C. Allen, Bellaire, Tex., assignor to The Texas Company, New York, N. Y., a corporation of Delaware Application May 22, 1953, Serial No. 356,820

2 Claims. (Cl. 166—39)

The present invention relates to the production of liquid hydrocarbons from subsurface producing formations via a producing well and is particularly concerned with maximizing the production of liquid hydrocarbons which, in the course of production, tend to impede flow through the porous earth formations from which they are drawn.

The invention has particular application to the production of liquid petroleum from reservoirs containing substantial amounts of heavy hydrocarbon fractions, and particularly normally solid constituents, such as paraffin, in a condition of unstable solution such that precipitation tends to occur in the formation about the well bore as the liquid is withdrawn, thereby progressively constricting the minute interstices of the formation pores.

In accordance with the present invention, a continuous flow of solvent liquid is injected into the oil-bearing formation in the vicinity of the point of production to mix with formation oil as it approaches the well bore, maintain it in readily flowing state, and retain the heavy fraction in solution. The injected solvent may be a fraction of the produced petroleum having a relatively high solvent affinity for the flow impairing fractions of the reservoir oil. Advantageously, also, it may be a relatively fluet fraction having a lower viscosity than the formation oil. In any event, it maintains the formation pores clear of obstruction and maximizes liquid flow into the producing well.

For example, the injected liquid may be a portion of the produced oil from which has been separated all or a portion of the formation clogging constituents. The injected stream is recycled to the formation in sufficient quantity to maintain the oil flowing to the well bore in a condition of good fluidity free from precipitates.

On the other hand, the recycled solvent oil may be a selected fraction of the produced oil or of the other hydrocarbon having a relatively high solvent affinity for the flow impairing fractions of the reservoir crude. For example, in the case of a waxy crude which tends to precipitate wax in the formation, an effective solvent fraction is a light, straight run distillate in the gasoline boiling range. Such fractions are usually of low carbon number and of high solvent affinity for paraffin wax. As the formation oil flows through the formation toward the well bore, it, therefore, admixes with the injected fraction, which retains the wax in solution, keeping the interstices of the producing formation open and in a condition of maximum permeability. As a result, oil production is maximized and the total recovery of oil is materially increased.

Injection of a relatively light liquid fraction, as above, additionally promotes production by increasing the flow rates of otherwise high viscosity crudes.

It will be apparent from the foregoing that the relative amount of solvent hydrocarbon re-injected or recycled into the producing formation may vary widely, depending primarily upon its specific solvent capacity for the offending fractions. For example, smaller quantities of a wax-free, straight run distillate are effective to retain the precipitable wax in solution in the crude than is the case where only a partially dewaxed crude is recycled to the formation.

In any event, an important advantage of the present invention resides in overcoming the decrease in permeability, and the resulting impairment of production which otherwise occurs in the production of petroleum liquids which contain flow-impairing fractions. By way of illustration, substantial quantities of waxy materials are frequently held in solution in the subsurface petroleum liquid. Solubility of the wax in the formation oil is favored by the relatively high temperatures and pressures typically prevailing in deep earth strata ordinarily encountered in petroleum production. The solubility is also, to a large extent, increased by the presence of dissolved gas such as methane.

However, as the liquid moves through the porous rock into the vicinity of the well bore, a substantial pressure drop is encountered. As a result, the gas evolves from solution and in so doing expands to cause a localized cooling effect.

Therefore, the solvent capacity of the liquid for wax decreases, and where the crude is highly saturated with wax, actual wax precipitation tends to occur. Wax precipitation may also be induced by the streaming potential set up by flow to the well bore. In any event, the oil-containing pores and interstices of oil bearing formations are ordinarily extremely minute and impairment of flow through the formation tends to result.

It has been proposed to back-wash, or, in effect, rinse the formation about the well bore by periodically injecting and withdrawing various solvents, but, manifestly, this procedure is difficult, time consuming, interferes with production, and only intermittently improves the production.

In direct contrast, the present invention enables realization of continuous maximum permeability of the formation and, accordingly, uninterrupted petroleum production.

The effectiveness of the present invention follows mainly from the fact that the pressure drop through the formation as oil flows into the bore hole is largely concentrated close to the margin of the well bore. In other words, the bulk of the pressure drop between the normal formation pressure and the pressure in the producing well bore (normally referred to as draw-down) occurs within only a few feet of the well bore. Therefore, it is only in this region that any substantial physical change occurs in the flowing oil, and it is only in this region that flow impairment becomes a serious problem.

Moreover, it will be obvious that the injected solvent oil will flow directly toward this region of pressure drop mixing freely with the produced oil, mingling with the production and maintaining it in fluent condition.

The present process, moreover, likewise tends to overcome clogging of the production string prior to reaching the stock tank.

Figs. 1 and 2 of the accompanying drawing schematically illustrate various embodiments of the practice of this invention.

In order to illustrate the present invention more clearly, reference is had to Fig. 1 of the attached drawing wherein the numeral 10 designates a well casing extending downwardly from ground surface 11 to an oil bearing subsurface formation 12. Within casing 10 is located a producing string or tubing 14 which terminates adjacent the producing formation just below packer 15 which seals off the production stream from the annular passage between the string 14 and the casing 10. The lower end of the casing is perforated opposite the production string 14 as at 16 and may be provided with screening, gravel packing, etc., not shown, or completed in any other manner such that produced oil flows from formation 12 upwardly through the production tube 14.

As previously intimated, the produced oil, as it flows upwardly through the tube is subjected to progressive temperature and pressure decrease. From the top of conduit 14 it passes into separator tank 17, located near the well head where it further cools and liberates dissolved gas.

The evolved-gas is continuously withdrawn from separator 17 through pipe 18 and the product oil which accumulates in the bottom as at 19 is withdrawn through pipe 20 to stock tank 21. It is to be remembered that coming from a remote subsurface formation there may be a substantial temperature drop by the time the liquid reaches the stock tank. Also, considerable amounts of gas are evolved during pressure drop to atmospheric. Accordingly, the oil in the stock tank usually separates a bottom sludge, known as bottom sediment and water, which in the case of wax liberating stock, comprises largely precipitated wax.

The sediment is continuously or periodically drawn off via pipe 22 or otherwise. In any event, a partially dewaxed oil is withdrawn via pipe 23 and pump 24. From the pipe 23 the partially dewaxed oil enters the annular passage between the flow string and casing and passes downwardly to a point just above the packer 15 where the casing is perforated as at 25.

Pump 24 operates at a pressure head, which is sufficient, together with the pressure head of oil in the annulus to force positive flow into the producing formation as indicated more or less diagrammatically by arrows 26. This means an injection pressure in excess of formation pressure. If the produced stream in the pipe comprises substantial proportions of gas, the pressure head of the relatively gas-free column of oil in the annulus about the flow string may be sufficient, in itself, to effect injection into the formation in the absence of pump 24 or in the presence of a pump operating under a relatively small pressure head.

Obviously, as the injected oil approaches and enters the formation, it progressively heats up to formation temperature and absorbs formation gas, thus acquiring an increased solvent capacity for wax.

Referring to the arrows applied to the producing formation for the purpose of indicating liquid flow, it will be seen that the oil injected through perforations 25 just above packer 15 flows downwardly into the main flow of oil 27 coming from the formation and mixes therewith so that the produced stream is thereby diluted and the precipitable constituents held in solution.

In place of stock tank 21, the sediment and wax may be separated by means of conventional thickeners, clarifiers or filters. It is also contemplated separating additional heavy constituents from the cycle stream of oil by chilling substantially below atmospheric temperature prior to separation. This will effect a yet further decrease in wax content.

In accordance with the embodiment shown in Fig. 2 of the drawing, the recycle stream comprises an essentially wax-free distillate of high solvent capacity for paraffin. To this end a still, comprising a still pot 23, air-cooled condenser 29 and a condensate trap 30 is mounted on separator 17. The still pot is continuously fed by thermosyphon effect from the crude accumulating in the bottom of the separator, via a bottom trap line 31 and an upper return line 32. A source of heat is continuously supplied to the pot, as for example, by burner 34. The overhead vapors from the still pot pass into condenser 29 through line 35 and any excess condensate accumulating in the trap 30 may flow back through pipe 36 into the still pot.

As above intimated, the condensate, preferably a relatively low boiling fraction about the gasoline boiling range, is drawn off through pipe 23 and conducted into the well casing for recycle to the formation.

Recycling an essentially wax-free distillate has the advantage of requiring less solvent as compared with the first embodiment described in Fig. 1, where the recycled solvent oil may still be relatively heavily burdened with wax even though partial separation has occurred.

The latter procedure, however, has the advantage of obviating extensive field equipment, and, moreover, is ordinarily effective where the formation blocking tendencies of the subsurface petroleum are not excessive. As previously indicated, however, the amount of recycle required is obviously less in the case of the recycle streams of higher solvent capacity, but, in any event, is readily determinable by any skilled engineer.

By way of example, reference is made to a subsurface producing well extending into a subsurface reservoir having a permeability of approximately 100 m. d. The reservoir fluid contains about 15% wax by weight and the draw-down in the well bore opposite the producing formation amounts to about 200 p. s. i. In experiencing this pressure drop in flowing to the well bore, about 1% of the total wax content of the reservoir oil tends to precipitate. After a substantial period of operation the wax precipitate formed in the interstices of the reservoir reduces the permeability to about 50 m. d. This results in the necessity for an increased draw-down pressure in order to maintain production rates. The increased draw-down pressure, however, increases wax precipitation and further impairs formation permeability.

In order to overcome this condition the produced oil is cooled in the stock tank to about 70° F. to effect a substantial partial dewaxing and the waxy sediment is separated. The resulting dewaxed fluid is returned down the casing annulus and continuously injected into the producing formation about two feet above the zone at which the reservoir oil flows into the producing well. About one barrel of the partially dewaxed stock tank oil is recycled into the formation per barrel of net production of liquid oil. The permeability of the formation rock about the bore hole remains continuously at its original value of about 100 m. d. and the original production rate continues uniformly at a draw-down of 200 p. s. i.

It is of particular importance to note that the amount of reservoir oil recoverable at a formation permeability of 100 m. d. amounts to about 50% more than is recoverable at the decreased permeability of 50 m. d.

The effect has been further demonstrated in the laboratory by adding slack wax and crystalline paraffin wax to a 1:1 mixture of kerosene and SAE 10 lubricating oil in amounts sufficient to form a hydrocarbon liquid having a pour point below room temperature and a cloud point above room temperature. The wax-oil mixture was continuously caused to flow by a 7.5 inch gravity head, from a reservoir maintained at 158° F. through a small capillary tube to room temperature. After about an hour the flow ceased due to complete blocking of the capillary tubing.

In the second experiment, a portion of the test fluid was cooled to room temperature overnight and filtered to remove a part of the wax. The filtrate was mixed in the ratio of 1:1 by volume with the original waxy fluid and the experiment repeated. At the end of 70 minutes the rate of flow through the capillary tube was approximately consistent at 1.5 cc. per minute and flow continued for an indefinite period of time. This indicates that only a small increase in solvent capacity for wax is effective to overcome a serious decrease in permeability where small quantities of wax tend to be precipitated.

While the present invention has been described in terms of recycling hydrocarbon fractions to the formation, nevertheless any effective fluent solvent liquid may be substituted therefor, as for example, carbon tetrachloride, ethylene dichloride and other chlorinated hydrocarbons, carbon disulfide and the like.

Oil additives effective to prevent wax deposit may also be added to the recycle stream. Such, for example, are the typical pour point depressants, such as "Paraflow", which is a commercial proprietary condensation product of chlorinated wax and naphthalene, or "Acryloid", which is a polymethylmethacrylate resin. The addition may be made to the recycled, partly dewaxed oil in an amount from about 0.05 to 1.5% by weight.

Obviously, many modifications and variations of the invention as herein set forth may be made without departing from the original spirit and scope thereof, and only such limitations should be imposed as are indicated in the appended claims.

I claim:

1. In the production of liquid petroleum via a well bore penetrating a liquid petroleum producing reservoir wherein a waxy hydrocarbon fraction which is dissolved in said liquid petroleum in said reservoir under reservoir conditions of temperature and pressure, tends to precipitate within said reservoir during the movement of said liquid petroleum from said reservoir into said well bore and thereby impair the flow of the produced liquid petroleum into said well bore, the improvement which comprises recovering liquid petroleum produced from said reservoir via said well bore, reducing the temperature of the recovered liquid petroleum to a temperature below that prevailing in said reservoir to precipitate therefrom said waxy hydrocarbon fraction and to yield a stock tank oil having a reduced amount of said waxy hydrocarbon fraction dissolved therein, said stock tank oil evidencing a solvent power for said waxy hydrocarbon fraction under formation conditions of temperature and pressure and continuously injecting at least a portion of said stock tank oil via said well bore into said reservoir into the vicinity from which said liquid petroleum is produced.

2. The method according to claim 1 wherein the amount of stock tank oil injected into the formation is in the ratio of about one volume per volume of net liquid petroleum production.

References Cited in the file of this patent

UNITED STATES PATENTS

| | | |
|---|---|---|
| 119,884 | Roberts | Oct. 10, 1871 |
| 1,816,260 | Lee | July 28, 1931 |
| 2,139,595 | Lerch et al. | Dec. 6, 1938 |
| 2,364,222 | Kaufman | Dec. 5, 1944 |
| 2,365,591 | Ranney | Dec. 19, 1944 |
| 2,412,765 | Buddrus et al. | Dec. 17, 1946 |